United States Patent [19]
Sieja

[11] 3,716,534
[45] Feb. 13, 1973

[54] THIADIAZOLES[3,4-D]-PYRIDAZINES
[75] Inventor: James Bernard Sieja, Wilmington, Del.
[73] Assignee: E. I. du Pont de Nemours and Company, Wilmington, Del.
[22] Filed: April 13, 1971
[21] Appl. No.: 133,722

[52] U.S. Cl. ........260/250 A, 260/45.8 N, 260/22 R, 260/37 R, 260/45.8 R, 106/22
[51] Int. Cl. ..............................C07d 51/04
[58] Field of Search..................260/250 A

[56] References Cited
OTHER PUBLICATIONS
L. Pollak et al., Tetrahedron (1966) Vol. 22, pp. 2073 to 2079.

Primary Examiner—Nicholas S. Rizzo
Attorney—Anthony P. Mentis

[57] ABSTRACT

Thiadiazolo[3,4-d]Pyridazines of the formula

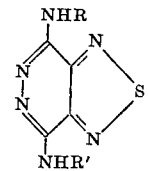

are colored compounds useful as color screens, dye intermediates and pigments.

6 Claims, No Drawings

THIADIAZOLES[3,4-D]-PYRIDAZINES

BACKGROUND OF THE INVENTION

1. Field of the Invention

This invention concerns a new class of colored heterocyclic organic compounds useful as color screens, dye intermediates and pigments.

2. Description of the Prior Art

I. Sekikawa, Bull. Chem. Soc. Japan 33, 1229 (1960) describes the preparation of a cyclic hydrazide of the formula

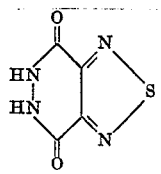

It appears to be the only known compound which has the ring system found in the compounds of the present invention corresponding to formula I.

DESCRIPTION OF THE INVENTION

The compounds of the invention are 4,7-diamino[1,2,5]-thiadiazolo[3,4-d]pyridazines of the formula I

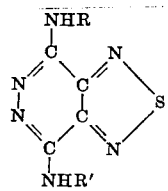

in which R and R', alike or different, are H or carbacyl, that is, —COR" where R" is hydrogen or an alkyl group of one to 19 carbon atoms, preferably of one to six carbon atoms, or aromatic hydrocarbyl group of six to 12 carbons or such aromatic hydrocarbyl group carrying an alkyl group of one to six carbon atoms.

The compound of formula I in which R and R' are hydrogen is formed by the reaction of hydrazine with 3,4-dicyano-1,2,5-thiadiazole at temperatures in the range from 50°–200°C. Reaction of this product with formic acid or a carboxylic acid anhydride yields the compound of formula I in which R and R' are carbacyl, the particular carbacyl groups corresponding to the acid or acid anhydride employed.

The reaction of hydrazine with 3,4-dicyano-1,2,5-thiadiazole may be illustrated as follows:

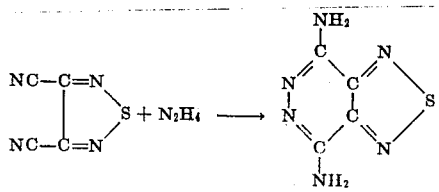

The reaction of hydrazine with 3,4-dicyano-1,2,5-thiadiazole may be carried out neat, particularly when an excess of liquid hydrazine is employed as a reaction medium. To provide for dissipation of the heat of reaction, the reaction is preferably carried out in the presence of any diluent which is inert to the reactants and products. Suitable diluents, for example, include primary alcohols, such as methanol, ethanol, and butanol; ethers, such as diethyl ether and tetrahydrofuran, and alcohol-water mixtures. No catalyst is required in the reaction.

Pressure is not a critical variable in the reaction and pressures both above and below atmospheric pressure may be employed. Atmospheric pressure is satisfactory.

The time required for the reaction to take place varies chiefly with the temperature employed, more rapid reactions being obtained at elevated temperatures. Times may vary from a few minutes (e.g., 5 minutes) up to several hours or more.

The molecular proportions of hydrazine and 3,4-dicyano-1,2,5-thiadiazole, which may be brought together to carry out the reaction above, is not limited since any proportions in which the reactants are brought together will permit formation of at least some of the desired product. Thus, hydrazine:3,4-dicyano-1,2,5-thiadiazole proportions from 1:100 to 100:1 may be employed. Proportions in the range of 10:1 to 1:2 are preferred and equimolar proportions are satisfactory.

The compounds of formula I are all colored crystalline solids. They are useful as light screens, intermediates for the preparation of dyes, and as pigments. When finely ground with approximately an equal weight of a standard varnish vehicle, they yield durable colored enamels suitable as protective coatings for wood, metal and the like.

SPECIFIC EMBODIMENTS OF THE INVENTION

The following are illustrative examples in which all parts are by weight unless stated otherwise.

EXAMPLE 1

4,7-Diamino[1,2,5]thiadiazolo[3,4-d]pyridazine

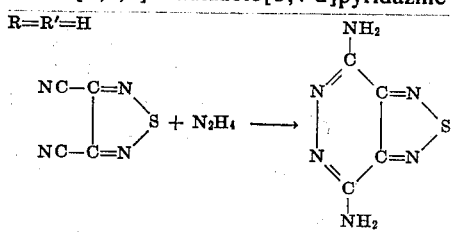

To a solution of 60 ml of 95 percent hydrazine in 470 ml of methanol was added all at once a solution of 30 g (0.22 mole) of 3,4-dicyano-1,2,5-thiadiazole in 470 ml of methanol. The solution was quickly brought to boiling and then set aside to cool. Filtration of the red-orange solid after standing 20 hours gave 36.7 g (99 percent) of 4,7-diamino[1,2,5]-thiadiazolo[3,4-d]pyridazine. This was recrystallized from hot water to give red-orange needles, decomposing at 285°C. A sample of this product prepared by a similar procedure showed the following: IR (KBr) 2.94, 3.02, 3.07, 3.20 μ (NH$_2$), 6.26, 6.45 μ (NH$_2$, C=C, C=N); UV (CH$_3$CN) 435mμ (2,000), 268mμ (12,600), 220mμ (10,700); MS M$^+$ m/e 168.

Anal. Calcd. for C$_4$H$_4$N$_6$S:
C, 28.56; H, 2.40; N, 49.97; S, 19.07
Found:
C, 28.63; H, 2.25; N, 49.81; S, 20.12.

EXAMPLE 2

4,7-Diamino[1,2,5]thiadiazolo[3,4-d]pyridazine

R = R' = H

A solution of 4.22 g (0.084 mole) of hydrazine hydrate in 60 ml of methanol was added to a solution of 9.54 g (0.07 mole) of 3,4-dicyano-1,2,5-thiadiazole in 100 ml of methanol. The solution, yellow upon mixing and red upon heating, was refluxed at about 64.5°C for 30 minutes. Filtration gave 10.5 g (89 percent) of red-orange solid. Recrystallization from hot water, followed by drying first in vacuo and then azeotropically (toluene) gave 4,7-diamino[1,2,5]-thiadiazolo[3,4-d]pyridazine as orange crystals, mp 260°C (dec).

EXAMPLE 3

4,7-Diacetamido[1,2,5]thiadiazolo[3,4-d]pyridazine

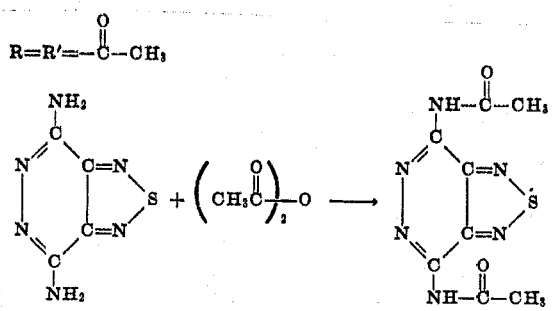

A mixture of 0.5 g of 4,7-diamino[1,2,5]thiadiazolo[3,4-d]pyridazine and 10 ml of acetic anhydride was stirred at room temperature for about 16 hours. The color gradually changed from red to yellow. The mixture was drowned in diethyl ether and filtered to give 0.6 g (80 percent yield) of 4,7-diacetamido[1,2,5]thiadiazolo[-d]pyridazine in the form of yellow crystals.

EXAMPLE 4

4,7-Diacetamido[1,2,5]thiadiazolo[3,4-d]pyridazine

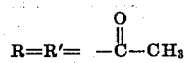

A slurry of 5.0 g (33.8 mmoles) of 4,7-diamino-[1,2,5]thiadiazolo[3,4-d]pyridazine and 60 ml of acetic anhydride was heated at 70°C under nitrogen for 3 hours. After concentration in vacuo, the remaining 6.2 g of solid was washed with $CH_2Cl_2$ (150 ml), tetrahydrofuran (200 ml), and $CH_3OH$ (200 ml) to leave 5.8 g of 4,7-diacetamido[1,2,5]-thiadiazolo[3,4-d]pyridazine in the form of a yellow solid, mp 220°C (dec). The IR and nmr spectra confirmed the structure.
Anal. Calcd. for $C_8H_8N_6O_2S$:
C, 38.09; H, 3.20; N, 33.32
Found:
C, 36.87; H, 3.18; N, 32.58.

EXAMPLE 5

4,7-Dibenzamido[1,2,5]thiadiazolo[3,4-d]pyridazine

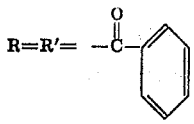

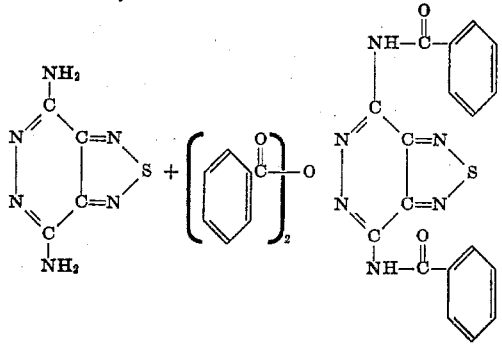

A slurry of 2.96 g (20 mmoles) of 4,7-diamino-[1,2,5]thiadiazolo[-d]pyridazine and 11.40 g (44 mmoles) of benzoic anhydride in 200 ml of tetrahydrofuran was refluxed under nitrogen for 30 hours. An orange solid precipitated after 1 hour. The mixture was concentrated in vacuo to give 4.93 g of dark orange solid. It was difficult to recrystallize this material due to its insolubility in most solvents. It was washed extensively with $CH_2Cl_2$, tetrahydrofuran, and ethyl acetate, leaving 4.0 g (53 percent) of 4,7-dibenzamido[1,2,5]thiadiazolo[3,4-d]pyridazine in the form of yellow crystals, mp 270°C (dec).
Anal. Calcd. for $C_{18}H_{12}H_6O_2S$:
C, 57.44; H, 3.21; N, 22.33
Found:
C, 56,74; 56.74; 3.03; N, 22.48.

When 4,7-diamino[1,2,5]thiadiazolo[3,4-d]pyridazine is heated with an excess of formic acid, the excess acid serves as a reaction medium and the product obtained is 4,7-diformamido-[1,2,5]thiadiazolo[-d]pyridazine. The same product is also obtained when a molecular excess of formic acid is added along with the acetic anhydride in the procedures of Examples 3 and 4.

When the acid anhydrides shown in Table I are substituted for acetic anhydride in the procedures of Examples 3 and 4, or for benzoic anhydride in the procedure of Example 5, the indicated products are obtained.

TABLE I

| Acid Anhydride | Product | R'' |
| --- | --- | --- |
| Propionic anhydride | 4,7-dipropionamido[1,2,5]-thiadiazolo[3,4-d]pyridazine | $C_2$ |
| Butyric anhydride | 4,7-dibutyramido[1,2,5]-thiadiazolo[3,4-d]pyridazine | $C_3$ |
| Hexanoic anhydride | 4,7-dihexanamido[1,2,5]-thiadiazolo[3,4-d]pyridazine | $C_5$ |
| Heptanoic anhydride | 4,7-diheptanamido[1,2,5]-thiadiazolo[3,4-d]pyridazine | $C_6$ |
| Cyclohexane carboxylic anhydride | 4,7-dicyclohexanecarbox-amido[1,2,5]thiadiazolo-[3,4-d]pyridazine | $C_6$ |
| Lauric anhydride | 4,7-dilauramido[1,2,5]-thiadiazolo[3,4,d]pyridazine | $C_{11}$ |

| | | |
|---|---|---|
| Stearic anhydride | 4,7-distearamido[1,2,5]-thiadiazolo[3,4-d]pyridazine | $C_{17}$ |
| Eicosanoic anhydride | 4,7-dieicosanamido[1,2,5]-thiadiazolo[3,4-d]pyridazine | $C_{19}$ |
| Phenylacetic anhydride | 4,7-diphenylacetamido-[1,2,5]thiadiazolo[3,4-d]-pyridazine | $C_7$ |
| o-Toluic anhydride | 4,7-di-o-methylbenzamido-[1,2,5]thiadiazolo[3,4-d]-pyridazine | $C_7$ |
| α-Naphthoic anhydride | 4,7-di-α-naphthocarboxamido[1,2,5]thiadiazolo-[3,4-d]pyridazine | $C_{10}$ |

EXAMPLE 6

This example illustrates the use of the compounds of this invention as pigments. One part of 4,7-dibenzamido[1,2,5]thiadiazolo[3,4-d]pyridazine was ground in about two parts of lithographic varnish comprising linseed oil containing 1 percent by weight of lead naphthenate drier. The product was a yellow lithographic ink, which when spread on paper, dried to yield a durable yellow decorative coating on the paper.

It is to be understood other varnish bases containing synthetic resins, rubbers, and other conventionally used varnish ingredients, may also be used.

The embodiments of the invention in which an exclusive property or privilege is claimed are defined as follows:

1. A compound having the formula

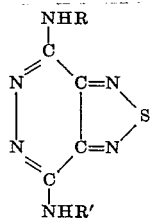

wherein

R and R', alike or different, are H or

in which

R'' is H or alkyl of one to 19 carbon atoms or an aromatic hydrocarbyl group of six to 12 carbon atoms, or such aromatic hydrocarbyl group carrying an alkyl group of one to six carbon atoms.

2. A compound according to claim 1 wherein R'' is alkyl of one to six carbon atoms.

3. The compound of claim 1 wherein R and R' are each hydrogen; 4,7-diamino[1,2,5]-thiadiazolo[3,4-d]pyridazine.

4. The compound of claim 1 in which R and R' are $$-\overset{O}{\underset{\|}{C}}-CH_3$$

4,7-diacetamido[1,2,5]thiadiazolo[3,4-d]pyridazine.

5. The compound of claim 1 in which R and R' are

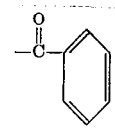

4,7-dibenzamido[1,2,5]thiadiazolo[3,4-d]pyridazine.

6. The process of heating 3,4-dicyano-1,2,5-thiadiazole with hydrazine at a temperature in the range of 50°–200°C.

* * * * *